(12) United States Patent
Takebayashi

(10) Patent No.: US 7,902,967 B2
(45) Date of Patent: Mar. 8, 2011

(54) BICYCLE CONTROL SYSTEM

(75) Inventor: Haruyuki Takebayashi, Osaka (JP)

(73) Assignee: Shimano Inc., Osaka (JP)

( * ) Notice: Subject to any disclaimer, the term of this patent is extended or adjusted under 35 U.S.C. 154(b) by 268 days.

(21) Appl. No.: 11/876,817

(22) Filed: Oct. 23, 2007

(65) Prior Publication Data
US 2009/0102628 A1  Apr. 23, 2009

(51) Int. Cl.
- B62J 6/00 (2006.01)
- B60Q 1/00 (2006.01)
- B62H 5/00 (2006.01)
- H03H 11/26 (2006.01)
- H03K 5/13 (2006.01)

(52) U.S. Cl. ............ 340/432; 340/425.5; 340/427; 327/261; 327/231; 327/235

(58) Field of Classification Search .......... 340/432, 340/425.5, 427, 825.69, 825.72; 327/261, 327/231, 235, 269, 276
See application file for complete search history.

(56) References Cited

U.S. PATENT DOCUMENTS

| | | | | |
|---|---|---|---|---|
| 5,327,479 A | * | 7/1994 | Engelke et al. | 379/52 |
| 5,870,381 A | * | 2/1999 | Kawasaki et al. | 370/213 |
| 5,883,582 A | * | 3/1999 | Bowers et al. | 340/10.2 |
| 6,192,300 B1 | | 2/2001 | Watarai et al. | |
| 6,204,775 B1 | * | 3/2001 | Kubacsi | 340/825.72 |
| 2002/0173299 A1 | * | 11/2002 | Buchholz et al. | 455/418 |
| 2003/0207731 A1 | | 11/2003 | Oohara | |
| 2004/0163870 A1 | * | 8/2004 | Liao et al. | 180/220 |
| 2005/0178235 A1 | | 8/2005 | Okada | |
| 2007/0000343 A1 | * | 1/2007 | Ueno | 74/473.12 |
| 2007/0228691 A1 | | 10/2007 | Fox | |
| 2007/0232425 A1 | | 10/2007 | Ichida | |

FOREIGN PATENT DOCUMENTS

| | | |
|---|---|---|
| EP | 1 357 678 A1 | 4/2003 |
| EP | 1 314 637 A1 | 5/2003 |
| EP | 1 391 375 A1 | 2/2004 |
| EP | 1 832 504 A2 | 9/2007 |

* cited by examiner

Primary Examiner — Davetta W Goins
Assistant Examiner — Fekadeselassie Girma
(74) Attorney, Agent, or Firm — Global IP Counselors, LLP

(57) ABSTRACT

A bicycle control system is provided with a switch device and a cycle computer. The switch device includes a switch operation member, a sensor arranged relative to the switch operation member to detect operation of the switch operation member, a processing unit operatively coupled to the sensor and a transmitter arranged to transmit an output signal. The processing unit of the switch device includes an identification code generating member, an operating signal generating member and an output member. The identification code generating member generates identification code related to identification of the switch device. The operating signal generating member generates an operation code indicative of operation of the switch operation member. The output member combines the identification code and the operation code as the output signal to be transmitted by the transmitter of the switch device.

20 Claims, 7 Drawing Sheets

BICYCLE CONTROL SYSTEM

BACKGROUND OF THE INVENTION

1. Field of the Invention

This invention generally relates to a bicycle control system that conducts interval communications from a rider operable switch device to a cycle computer. More specifically, the invention relates to a bicycle control system in which a switch operation signal is correctly recognized by a cycle computer even if a communication outage (e.g., interference or interruption in communications) occurs.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Recently, bicycles have been equipped with electrical components to make riding easier and more enjoyable for the rider. Some bicycles are equipped with automatic shifting units that are automatically adjusted according to the riding conditions that are determined by a cycle computer or control unit. In particular, the front and rear derailleurs have recently been automated. Moreover, various electronic devices have been used to determine one or more operating parameters for controlling the derailleurs and providing information to the rider. Thus, the cycle computer or control unit of the bicycle not only provides information to the rider, but is also used in controlling various components of the bicycle. Thus, it is desirable to provide reliable and accurate communications between the cycle computer or control unit and the other bicycle components that cooperate together.

In a conventional bicycle control system, the bicycle is provided with a plurality of sensors (speed sensor, cadence sensor, etc.) and a cycle computer. The sensors (speed sensor, cadence sensor, etc.) are connected to the bicycle at various stationary locations such as on a front fork, a chain stay, a seat tube, etc. The cycle computer is typically mounted on the bicycle handlebar. The bicycle cycle computer displays various kinds of information regarding the speed, the pedal revolution per minute (rpm), the gear in operation, the pulse of the rider, the ambient temperature, the geographical height and the like.

Also in a conventional bicycle control system, control switches (gear shift control switch, suspension control switch, display control switch and stop watch control switch et al.) are provided for inputting commands or control signals to the cycle computer. The control switches are attached at grip parts (both ends) of the bicycle handlebar. Typically, wires are used to connect each of the sensors and the control switches to the cycle computer.

More recently, some bicycle control system use wireless communications to communicate signals to the cycle computer. Thus, the cycle computer and the input devices communicate by wireless communications (radio communication, or infrared communication). For example, if an upshift control switch is pressed, the shift control switch sends a switch signal to the cycle computer. When the cycle computer receives the switch signal, the cycle computer determines what this signal is, what does this signal means, and what the value of the signal is. After, the cycle computer detects and interprets "this signal is an upshift signal", and sends a command signal that directs a (front or rear) derailleur to upshift. In this conventional system, the cycle computer needs time for detecting and interpreting the signal from the switch unit. Thus, the data can not be transmitted and received in real time. Therefore, if a communication outage happens due some interference or interruption in communications, then the data may be unrecognizable or falsely recognized.

In view of the above, it will be apparent to those skilled in the art from this disclosure that there exists a need for an improved bicycle control system. This invention addresses this need in the art as well as other needs, which will become apparent to those skilled in the art from this disclosure.

SUMMARY OF THE INVENTION

One object of the present invention is to provide a bicycle control system in which a switch operation signal is correctly recognized by a cycle computer even if a communication outage (e.g., interference or interruption in communications) occurs.

The foregoing object can basically be attained by providing a bicycle control system that comprises a switch device and a cycle computer. The switch device includes a switch operation member, a sensor arranged relative to the switch operation member to detect operation of the switch operation member, a processing unit operatively coupled to the sensor and a transmitter arranged to transmit an output signal. The cycle computer includes a receiver arranged to receive the output signal from the transmitter of the switch device. The processing unit of the switch device includes an identification code generating member, an operating signal generating member and an output member. The identification code generating member generates identification code related to identification of the switch device. The operating signal generating member generates an operation code indicative of operation of the switch operation member. The output member combines the identification code and the operation code as the output signal to be transmitted by the transmitter of the switch device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
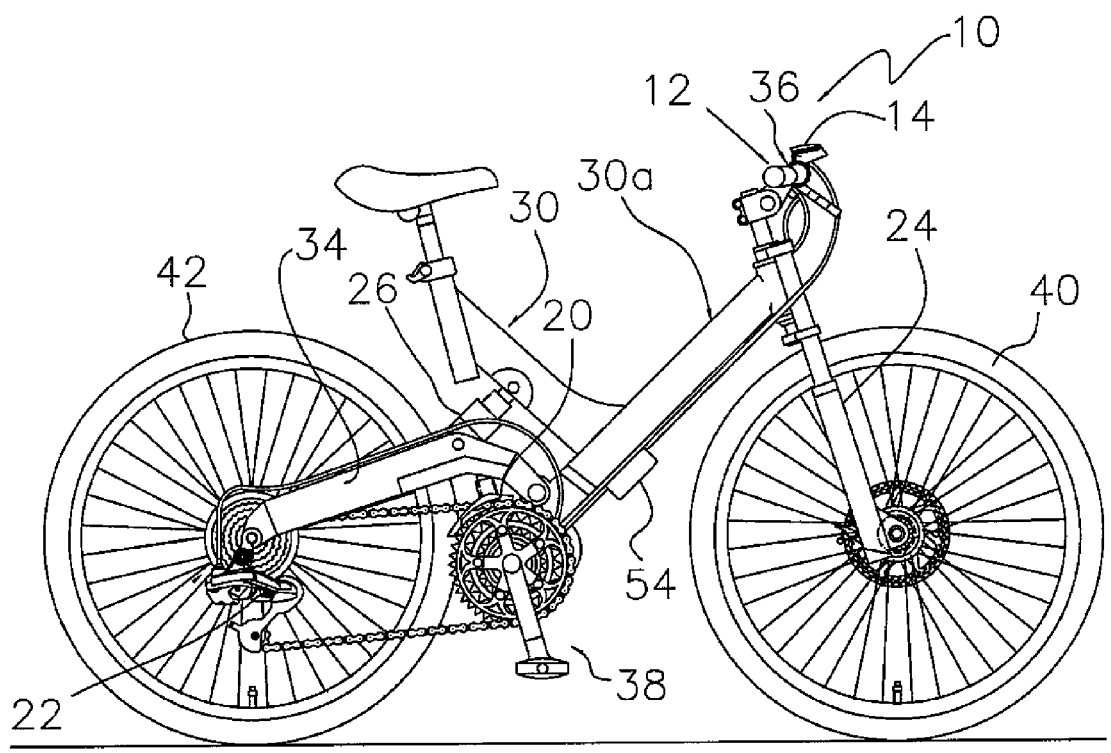
FIG. 1 is a side elevational view of a bicycle equipped with a bicycle control system that includes a cycle computer, a pair of sensors and a pair of sensed elements (magnets) in accordance with one preferred embodiment.
Figure 2:
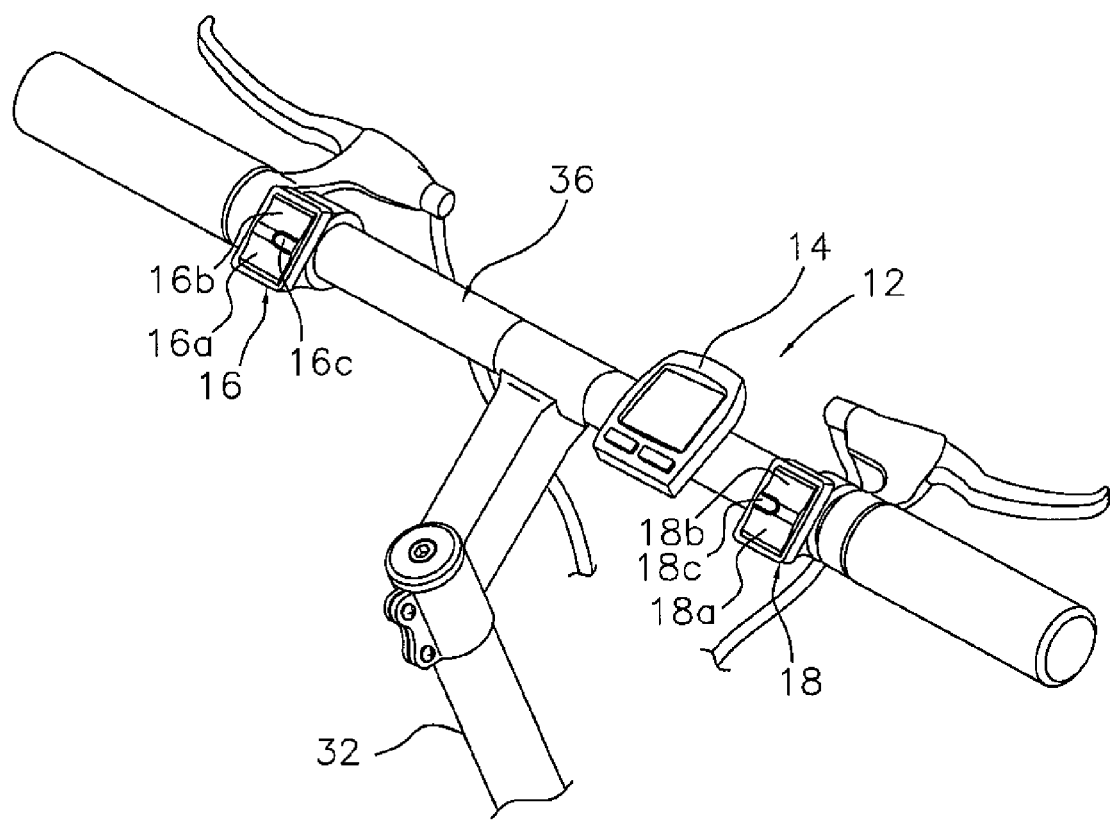
FIG. 2 is a top perspective view of the handlebar portion of the bicycle showing the cycle computer in accordance with the illustrated embodiment.

Referring initially to FIGS. 1 and 2, a bicycle 10 is illustrated that is equipped with a bicycle control system 12 that controls the shifting of the bicycle 10 and the stiffness of the suspension of the of the bicycle 10. Basically, the bicycle control system 12 includes a cycle computer 14, a first electrical switch unit 16 a second electrical switch unit 18, a front electrically powered derailleur 20, a rear electrically powered derailleur 22, a front suspension fork 24 and a rear shock absorber 26. In the illustrated embodiment, the bicycle control system 12 preferably conducts interval wireless communications between the cycle computer 14 and the switch units 16 and 18. The cycle computer 14 communications shift signals to the derailleurs 20 and 22 via wires or wirelessly communications for controlling the shifting of the derailleurs 20 and 22. Similarly, the cycle computer 14 communications suspension control signals to the front suspension fork 24 and the rear shock absorber 26 via wires or wirelessly communications for controlling the stiffness of the front suspension fork 24 and the rear shock absorber 26. While the switch units 16 and 18 are used to control shifting and suspension stiffness, it will be apparent to those skilled in the art from this disclosure that the switch units 16 and 18 can be used to control other functions of the bicycle 10.

In its broadest terms, the present invention can be implemented in any bicycle that utilizes a switch and a cycle computer that communicate with each other via wires or wirelessly communications. In other words, in its broadest terms, the present invention can also be implemented in either wired systems or wireless systems, which are subject to communication interference, a dropped communication signals or inaccurate signals being received by a cycle computer.

As seen in FIG. 1, the bicycle 10 includes, among other components, a main frame 30, a rear suspension arm 34, a handlebar unit 36, a drive train 38, a front wheel 40 and a rear wheel 42. The front suspension fork 24 is pivotally mounted to the main frame 30. The rear suspension arm 34 is pivotally mounted to the main frame 30. The shock absorber 26 is operatively mounted between the main frame 30 and the rear suspension arm 34 in a conventional manner. The handlebar unit 36 is fastened to an upper end of the front suspension fork 24. The front wheel 40 is mounted to the front fork 32, while the rear wheel 42 mounted to the rear suspension arm 34. The drive train 38 is mounted between the main frame 30 and the rear wheel 42 in a conventional manner.

Figure 3:
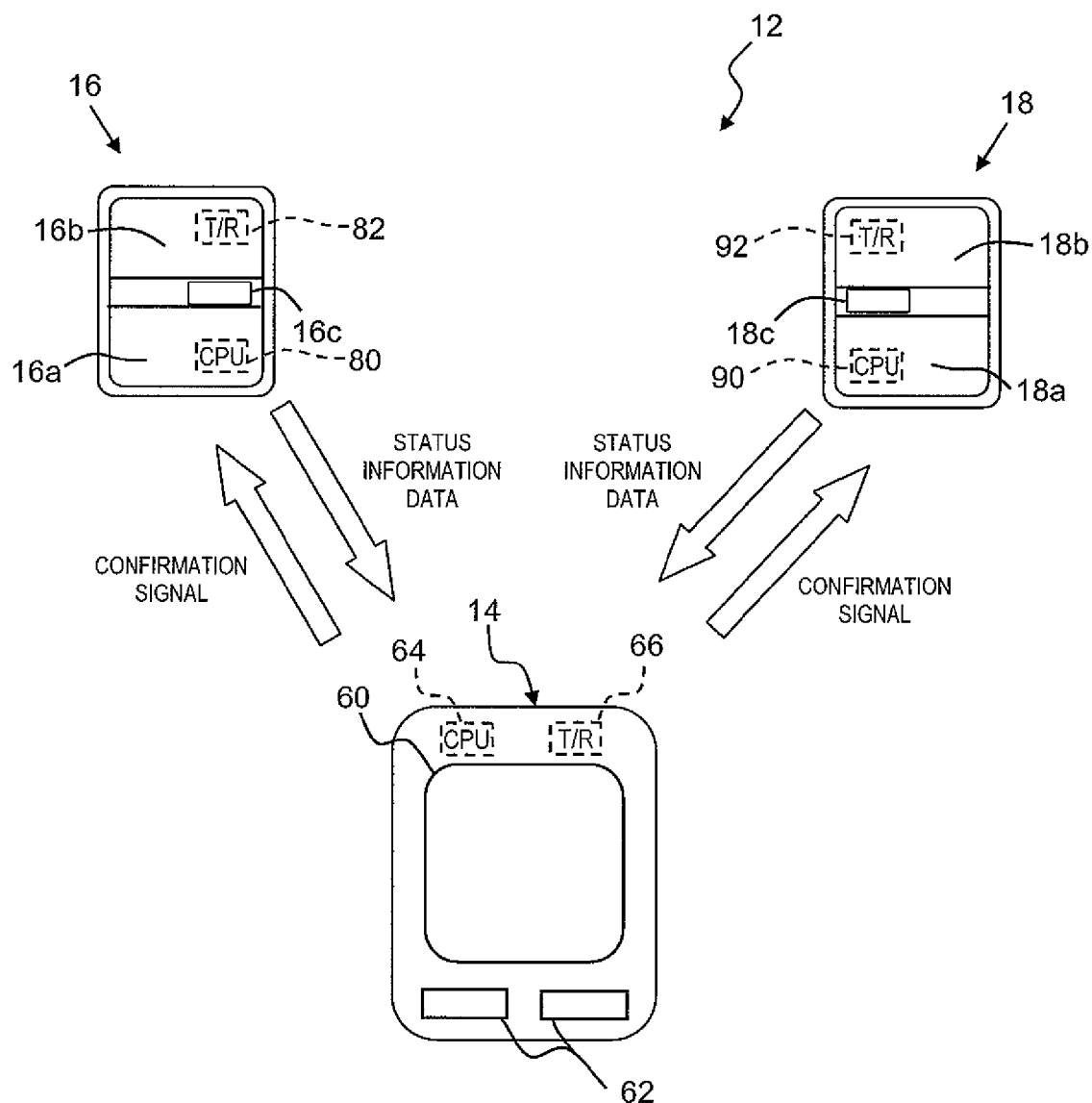
FIG. 3 is a simplified schematic view of the communication between way wireless communications between the cycle computer and the switch units in accordance with the illustrated embodiment

As seen in FIG. 2, the cycle computer 14 and the switch units 16 and 18 are mounted to the handlebar unit 36. Wireless communications are conducted at prescribed intervals from the switch units 16 and 18 to the cycle computer 14 as seen in FIG. 3. The cycle computer 14 also wirelessly preferably transmits a confirmation signal to the electrical switch units 16 and 18 upon receiving updated signals from the switch units 16 and 18. Thus, the derailleurs 20 and 22 (see FIG. 1) are operated by electrical switch units 16 and 18 (see FIG. 2), respectively, via the cycle computer 14. The electrical switch units 16 and 18 are also used to control the stiffness's of the front suspension fork 24 and the shock absorber 26, respectively, via the cycle computer 14. Preferably, a battery and/or one of the front wheels 40 and 42 is provided with a hub dynamo that serve as a power source for the electrical components. As seen in FIG. 1, a battery 54 is mounted to the downwardly facing surface of a down tube 30a the main frame 30 and electrically coupled to the electrically powered derailleurs 20 and 22. The cycle computer 14 preferably has a built in battery. Likewise, preferably, each of the electrical switch units 16 and 18 has its own built in battery.

As best seen in FIG. 3, the cycle computer 14 basically includes an LCD display 60, a pair of input buttons 62, a microcomputer 64 and a two way wireless communication device 66. The microcomputer 64 is a conventional device with various control programs such as shifting control programs, suspension control programs and display programs. The microcomputer 64 includes, among other things a central processing unit CPU, an I/O interface and memory (RAM and ROM). The internal RAM of the microcomputer 64 stores statuses of operational flags and various control data. The two way wireless communication device 66 is a conventional device that includes a transmitter/receiver, which is indicated as T/R in FIG. 5. The two way wireless communication device 66 wirelessly communications with at least the shift units 16 and 18. The communication protocol (communication timings, communication data format and communication data contents) can be any conventional communication protocol or can be a specialized communication protocol as needed and/or desired. In any event, the microcomputer 64 of the cycle computer 14 controls the shifting of the derailleurs 20 and 22 and controls the stiffness's of the front suspension fork 24 and the shock absorber 26 in response to operation of the electrical switch units 16 and 18.

In the illustrated embodiment, the switch unit 16 has a pair of front gearshift switches 16a and 16b, which perform a manual gear-shifting operation of the front electrically powered derailleur 20 and a suspension mode switch 16c, which changes the stiffness of the front suspension fork 24 between hard and soft. The gearshift switch 16a is a switch for shifting the front electrically powered derailleur 20 incrementally downward. The gearshift switch 16b is used for incrementally shifting the front electrically powered derailleur 20 upward.

Similarly, the electrical switch unit 18 has a pair of rear gearshift switches 18a and 18b, which perform a manual gear-shifting operation of the rear electrically powered derailleur 22 and a shift mode switch 18c, which changes the stiffness of the shock absorber 26 between hard and soft. The gearshift switch 18a is a switch for shifting the rear electrically powered derailleur 22 incrementally downward. The gearshift switch 18b is used for incrementally shifting the rear electrically powered derailleur 22 upward.

Figure 4:
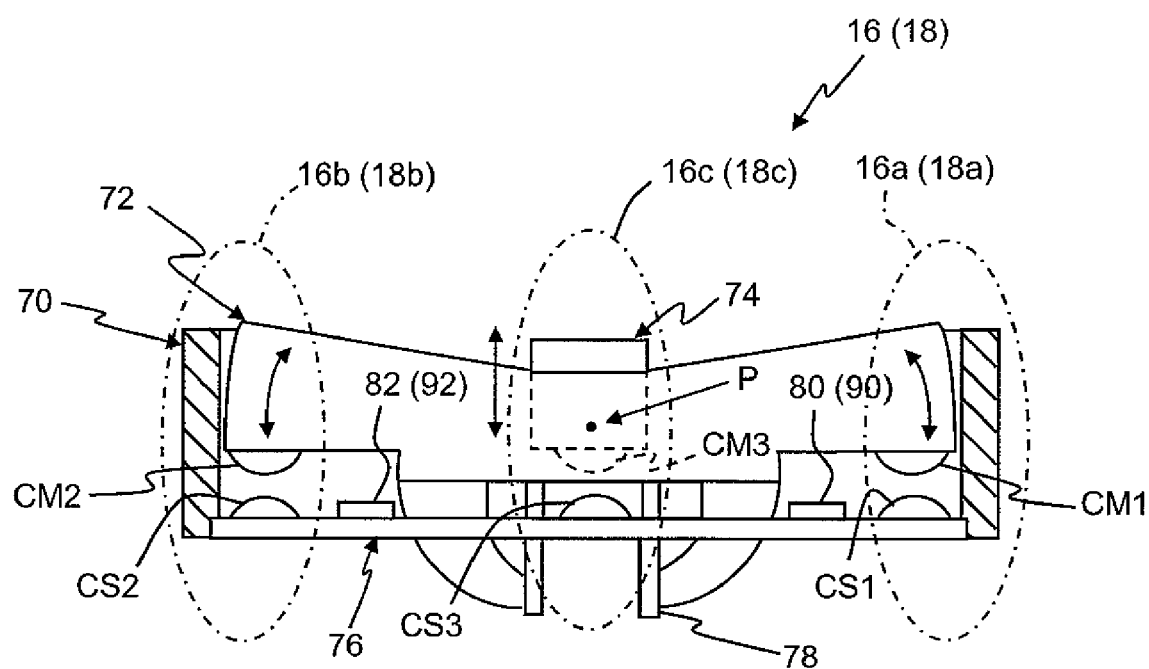
FIG. 4 is a simplified side elevational view of one of the switch units with the housing broken away to reveal the internal structure of the switch unit.

Since the basic construction of the switch units 16 and 18 is identical in a structural sense, except that they are mirror images of each other and they are programmed differently, the same reference numerals or symbols will be used to indicate the corresponding parts. As seen in FIG. 4, each of the switch units 16 and 18 includes a housing 70, a common toggle or rocker member 72 pivotally mounted to the housing 70, a push button 74, and a printed circuit board 76. In each of the switch units 16 and 18, the rocker member 72 is biased to a neutral rest position by a first biasing member 78 in the form of a torsion spring, while the push button 74 is biased to a neutral rest position by a second biasing member (not shown) in the form of a coiled compression spring.

The printed circuit board 76 for the switch unit 16 includes a microprocessor (CPU) 80 in FIGS. 3 and 4, and a transmitter/receiver (T/R) 82, while the printed circuit board 76 for the switch unit 18 includes a microprocessor (CPU) 90 in FIGS. 3 and 4, and a transmitter/receiver (T/R) 92 in FIGS. 3 and 4. The printed circuit board 76 also includes first and second stationary contacts CS1 and CS2 that selectively engage first and second movable contacts CM1 and CM2 formed on the rocker member 72 in response to pivotal movement of the rocker member 72, and a third stationary contact CS3 that selectively engages a third movable contact CM3 formed on the push button 74 in response to linear movement of the push button 74 relative to the rocker member 72. Thus, in the illustrated embodiment, the switch units 16 and 18 include both a rocker switch and a push button switch. The front and rear gearshift switches 16a and 18a are each formed by a part of the rocker member 72 and the contacts CM1 and CS1 in their respective switch units 16 and 18. The front and rear gearshift switches 16b and 18b are each formed by a part of the rocker member 72 and the contacts CM2 and CS2 in their respective switch units 16 and 18. The shift mode switches 16c and 18c are each formed by the push button 74 and the contacts CM3 and CS3 in their respective switch units 16 and 18.

Figure 5:
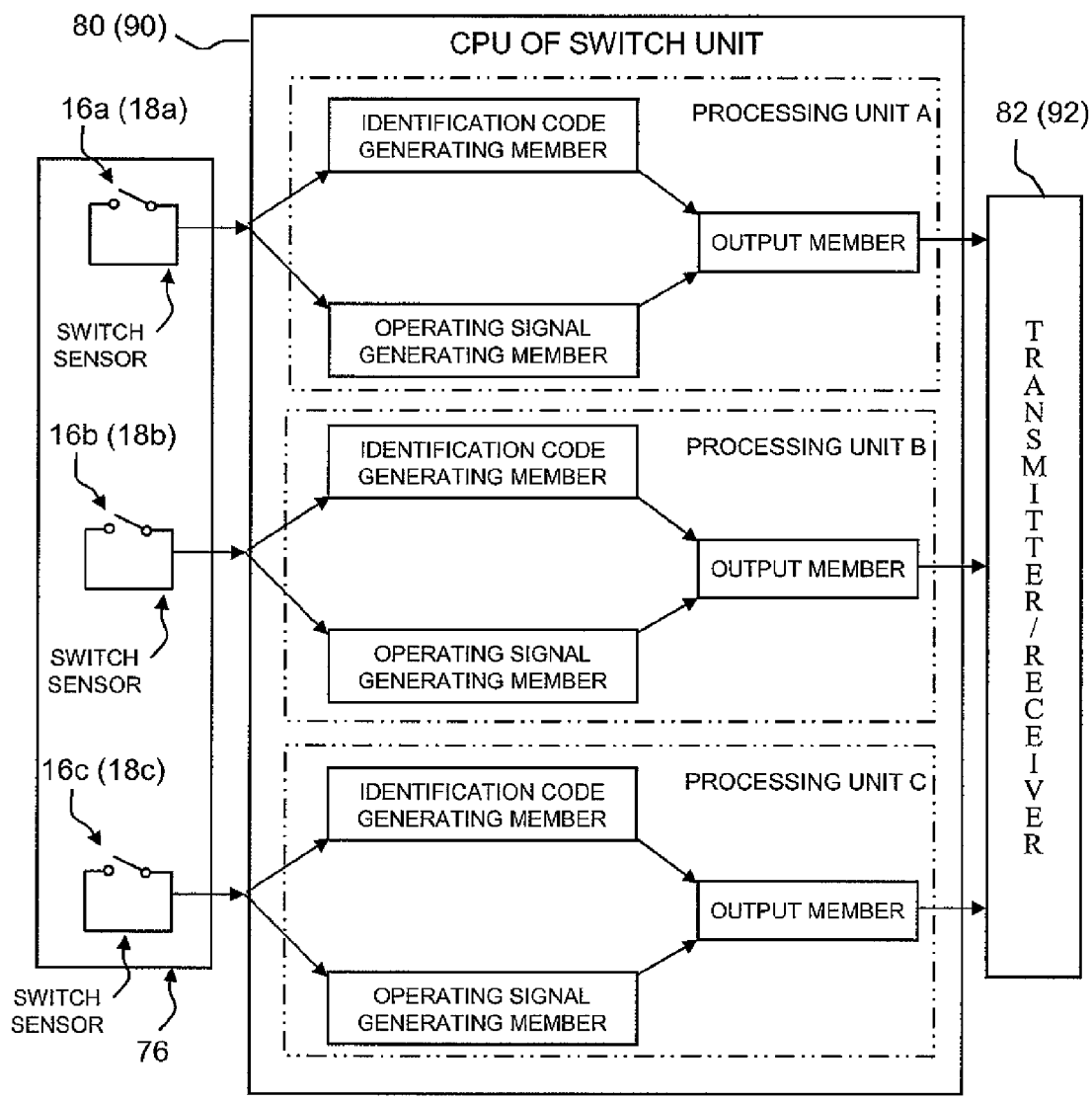
FIG. 5 is a simplified block diagram of the microprocessor of one of the switch units.

As seen in FIG. 5, the printed circuit board 76 has three circuits that are opened and closed in response to the operation of the switches 16a to 16c (e.g., a switch sensor), respectively. The opening and closing of these three circuits by the selective operation of the switches 16a to 16c result an operation signal (pulse) to be transmitted to a corresponding one of the processing units A, B or C of the microprocessor 80 or 90 of the switch unit 16 or 18, respectively. The microprocessor 80 or 90 of the switch unit 16 or 18 determines which of the switches 16a to 16c or 18a to 18e was operated based on which electrical circuit of the printed circuit board 76 is closed in response to depressing the corresponding one of the switches 16a to 16c or 18a to 18c. The microprocessor 80 or 90 of the switch unit 16 or 18 also determines based on the length of the operation signal (pulse) that the operation signal (pulse) is either a short push signal or a long push signal. In particular, a short push signal is determined to occur when the electrical circuit is closed and opened within a single time period that acts as a prescribed time threshold. Thus, a counter or timer can be used to measure a period of time occurring between the start of the depressing of the switch and the releasing of the switch transmissions by the transmitter/receiver 92 of the switch unit 16 act as a prescribed time threshold in the illustrated embodiment.

In each of the switch units 16 and 18, the rocker member 72 is biased to a neutral rest position by a first biasing member S in which the first and second movable contacts CM1 and CM2 are spaced from the first and second stationary contacts CS1 and CS2. Pivotal movement of the rocker member 72 in a first rotational direction about pivot P causes the first movable contact CM1 and the first stationary contact CS1 to contact each other. Pivotal movement of the rocker member 72 in a second rotational direction (opposite to the first rotational direction) about pivot P causes the second movable contact CM2 and the second stationary contact CS2 to contact each other. Generally, when the rocker member 72 is rotated (depressed) so that one of the movable contacts CM1 and CM2 contacts a corresponding one of the stationary contacts CS1 and CS2, an operation signal is detected by the microprocessor 80 or 90 of the corresponding one of the switch units 16 and 18. As long as the rocker member 72 is depressed, the microprocessor 80 or 90 detects the operation signal. Thus, the microprocessor 80 or 90 detects whether the rider has depressed the rocker member 72 for a short period of time or a long period of time. When the rider has depressed the rocker member 72 for a short period of time below a first prescribed time threshold, then the microprocessor 80 or 90 generates a first operation signal as the operating signal to indicate a short switch operating action by the rider. On the other hand, when rider has depressed the rocker member 72 for a long period of time above a second prescribed time threshold, then the microprocessor 80 or 90 generates a second operation signal as the operating signal to indicate a long switch operating action by the rider. The second prescribed time threshold can be equal to or greater than the first prescribed time threshold as needed and/or desired.

The shift mode switches 16c and 18c operate in the same manner as front and rear gearshift switches 16b and 18b in response to the push button 74 being depressed. The push button 74 is biased to a neutral rest position by a second biasing member (not shown). Generally, when the push button 74 is depressed so that the movable contacts CM3 contacts the stationary contact CS3, an operation signal is detected by the microprocessor 80 or 90 of the corresponding one of the switch units 16 and 18. As long as the push button 74 is depressed, the microprocessor 80 or 90 detects the operation signal. Thus, the microprocessor 80 or 90 detects whether the rider has depressed the push button 74 for a short period of time or a long period of time. When the rider has depressed the push button 74 for a short period of time below a first prescribed time threshold, then the microprocessor 80 or 90 generates a first operation signal as the operating signal to indicate a short switch operating action by the rider. On the other hand, when rider has depressed the push button 74 for a long period of time above a second prescribed time threshold, then the microprocessor 80 or 90 generates a second operation signal as the operating signal to indicate a long switch operating action by the rider. The second prescribed time threshold can be equal to or greater than the first prescribed time threshold as needed and/or desired.

Each of the switch units 16 and 18 constitutes three switch devices with the rocker member 72 and the push button 74 constituting switch operation members. The electrical circuits of the corresponding pairs of the contacts (CS1, CM1, and CS2, CM2, and CS3, CM3) constitute switch sensor that are arranged relative to the switch operation members (e.g., the rocker member 72 or the push button 74) to detect operation of the switch operation members. As seen in FIG. 5, each of the microprocessors 80 and 90 of the switch units 16 and 18 has three processing units (e.g., one for each of the switches) operatively coupled to the sensors and the transmitter 82 or 92 of the corresponding one of the switch units 16 and 18 such that the transmitter 82 or 92 are arranged to transmit an output signal to the cycle computer 14 in response to operation of the switch operation members (e.g., the rocker member 72 or the push button 74).

Each switch device of the switch units 16 and 18 can be operated by quickly pressing and releasing (short push), or pressing and holding (long push) for a short period of time (usually less than one second). The microprocessors 80 and 90 of the switch units 16 and 18 are each configured (e.g., programmed) to distinguish between the short push and the long push need in an operation signal of each of the switch devices of the switch units 16 and 18. Preferably, microprocessors 80 and 90 of the switch units 16 and 18 are each further configured (e.g., programmed) to transmit an output signal with status information data that includes a switch identification code and a switch operation code for each of the switches 16a, 16b and 16c and the switches 18a, 18b and 18c. in the illustrated embodiment, the status information data preferably includes (1) the type or identification of the switch device being operated, (2) the type of switch operation (e.g., a short push or a long push), (3) identification of number of switch operations, and (4) time lag correction data indicating when the switch device was operated.

As seen in FIG. 5, the microprocessor 80 or 90 of each of the switch units 16 and 18 includes an identification code generating member, an operating signal generating member and an output member. The identification code generating member generates switch identification data or code related to identification of the switch device. The operating signal generating member generates a switch operation data or code indicative of operation of the switch operation member (the rocker member 72 or the push button 74). The output member combines the switch identification code and the switch operation code as the output signal transmitted by the transmitter 82 or 92 of the switch unit 16 or 18.

Basically, the switch identification code is a signal that can be used to distinguish one switch device from another switch device In other words, the switch identification code is a signal that is indicative of the type or particular switch device that is being operated. The switch operation code is a signal that provides information or data relating to the operation of the switch device including, but not limited to, a number of times that a switch device is pressed, a type of switch operation (e.g., a short push or a long push), and time lag correction data indicating when the switch device was operated. By supplying this information to the cycle computer 14, the cycle computer 14 can accurately and separately recognize the operations of a plurality of switch devices even if two or more switches are operated at the same time.

Thus, the microprocessor 80 (e.g., processing units A, B and C) of the switch unit 16 is configured to distinguish between the operations of the switches 16a, 16b and 16c and produce a different switch identification code for each of the switches 16a, 16b and 16c. Also the microprocessor 80 of the switch unit 16 is configured to detect the type of switch operation (e.g., a short push or a long push), the number of switch operations, and the operation timing of the switch device.

Likewise, the microprocessor 90 (e.g., processing units A, B and C) of the switch unit 18 is configured to distinguish between the operations of the switches 18a, 18b and 18c and produce a different switch identification code for each of the switches 18a, 18b and 18c. Also the microprocessor 90 of the switch unit 18 is configured to detect the type of switch operation (e.g., a short push or a long push), the number of switch operations, and the operation timing of the switch device.

Figure 6:
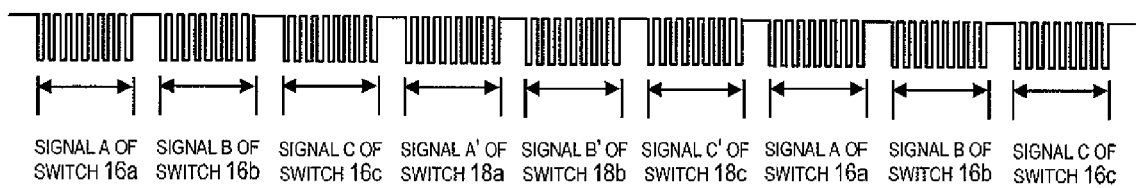
FIG. 6 is a timing chart showing the periodic transmission intervals of the two switch units with the transmission intervals of the switch units being offset.

Referring now to FIG. 6, a timing chart is illustrated showing the periodic transmission intervals of the two switch units 16 and 18 with the transmission intervals of each of the switch devices of the switch units 16 and 18 being offset from each other to avoid interference. In the illustrated embodiment, the switch units 16 and 18 have prescribed transmission timings such that the output signals from each are sent to the cycle computer 14 at a reoccurring prescribed interval in a non-overlapping manner. In other words, the time between transmissions of the output signals are equally spaced apart for each of the switch devices of the switch units 16 and 18 to avoid interference. In the illustrated embodiment, the output signals for each of the switch units 16 and 18 cover multiple switch devices. In other words, each of the switches 16a to 16c and 18a to 18c has a separate prescribed transmission timing occurring at a prescribed interval in a non-overlapping manner with all of the prescribed transmission timings of the other ones of the switches 16a to 16c and 18a to 18c.

The microprocessors 80 and 90 of the switch units 16 and 18 preferably use a binary code to send the output signals as the status information data that includes the switch identification code and the switch operation code. Preferably, the status information data has two byte length. However, the SW operation information may have a different length according to a control system or a desired specification of the system. The following binary code can be used with the illustrated embodiment.

| Hexadecimal | Binary | Decimal |
| --- | --- | --- |
| 0 | 0 0 0 0 | 0 |
| 1 | 0 0 0 1 | 1 |
| 2 | 0 0 1 0 | 2 |
| 3 | 0 0 1 1 | 3 |
| 4 | 0 1 0 0 | 4 |
| 5 | 0 1 0 1 | 5 |
| 6 | 0 1 1 0 | 6 |
| 7 | 0 1 1 1 | 7 |
| 8 | 1 0 0 0 | 8 |
| 9 | 1 0 0 1 | 9 |
| A | 1 0 1 0 | 10 |
| B | 1 0 1 1 | 11 |
| C | 1 1 0 0 | 12 |
| D | 1 1 0 1 | 13 |
| E | 1 1 1 0 | 14 |
| F | 1 1 1 1 | 15 |

One example of a binary code used for the status information data is shown below in Table 1. The following Table 1 shows one example of a binary code used to provide the switch identification code and the switch operation code to the cycle computer 14 where the bicycle 10 is provided with three switch devices A-SW, B-SW and C-SW.

TABLE 1

| | | TYPE OF SWITCH (SWITCH ID) Type of Switch 00: All SWs 01: A-SW 02: B-SW 03: C-SW | | TYPE OF SWITCH OPERATION 00: OFF 01: Short push 02: Long push 03: Spare | | IDENTIFICATION OF NUMBER OF SWITCH OPERATIONS Number of Switch Operations (Variable as needed) | | | |
| --- | --- | --- | --- | --- | --- | --- | --- | --- | --- |
| All SWs | OFF | 0 | 0 | 0 | 0 | 0 | 0 | 0 | 0 |
| A-SW | OFF | 0 | 1 | 0 | 0 | 0 | 0 | 0 | 0 |

TABLE 1-continued

|   |   | TYPE OF SWITCH (SWITCH ID) Type of Switch 00: All SWs 01: A-SW 02: B-SW 03: C-SW | | TYPE OF SWITCH OPERATION 00: OFF 01: Short push 02: Long push 03: Spare | | IDENTIFICATION OF NUMBER OF SWITCH OPERATIONS Number of Switch Operations (Variable as needed) | | | |
|---|---|---|---|---|---|---|---|---|---|
|  | Short push | 0 | 1 | 0 | 1 | Loop count (0-F) | | | |
|  | Long push | 0 | 1 | 1 | 0 | 0: initial value of Long push Loop count (1-F) | | | |
| B-SW | OFF | 1 | 0 | 0 | 0 | 0 | 0 | 0 | 0 |
|  | Short push | 1 | 0 | 0 | 1 | Loop count (0-F) | | | |
|  | Long push | 1 | 0 | 1 | 0 | 0: initial value of Long push Loop count (1-F) | | | |
| C-SW | OFF | 1 | 1 | 0 | 0 | 0 | 0 | 0 | 0 |
|  | Short push | 1 | 1 | 0 | 1 | Loop count (0-F) | | | |
|  | Long push | 1 | 1 | 1 | 0 | 0: initial value of Long push Loop count (1-F) | | | |

In addition to the basic status information data (the switch identification code and the switch operation code) set forth in Table 1, the microprocessors CPU of the switch units 16 and 18 can also sent the additional status information data of Table 2 to the cycle computer 14.

TABLE 2

|  | NUMBER OF RETRANSMISSIONS (Variable as needed) | TIME LAG CORRECTION DATA FOR SWITCH OPERATION TIMING (Timing itself or Corresponding value) |
|---|---|---|
| All SWs A-SW B-SW C-SW | Values from 1 to F are available | Values from 0 to F are available |

By transmitting the status information data (the switch identification code and the switch operation code), the microprocessor 64 of the cycle computer 14 can correctly recognized the switch operation performed by the rider at the next timing even if the communication outage happens. Thus, using the status information data (the switch identification code and the switch operation code), the microcomputer 64 of the cycle computer 14 controls the shifting of the derailleurs 20 and 22 and controls the stiffness's of the front suspension fork 24 and the shock absorber 26 in response to operation of the electrical switch units 16 and 18. For example, when a rider performs a single short push on the switch 16*a* or 18*a*, the derailleur 20 or 22 is shifted down one gear. When a rider performs a single short push on the switch 16*b* or 18*b*, the derailleur 20 or 22 is shifted up one gear. When a rider performs a single long push on the switch 16*a* or 18*a*, the derailleur 20 or 22 is shifted down two or more gears depending on the length that the switch is operated. When a rider performs a single long push on the switch 16*b* or 18*b*, the derailleur 20 or 22 is shifted up two or more gears depending on the length that the switch is operated. When a rider performs a single short push on the switch 16*c* or 18*c*, the suspension 24 or the shock absorber 26 is locked out. When a rider performs a single long push on the switch 16*c* or 18*c*, the suspension 24 or the shock absorber 26 is unlocked.

When a rider performs multiple long pushes in a prescribed period of time on any of the switches 16*a* to 16*c* and 18*a* to 18*c*, then the cycle computer 14 enters a "Set Mode" in which various parameters of the derailleurs 20 and 22, the suspension 24 and the shock absorber 26 can be adjusted. For example, the trim adjustment settings of the derailleurs can be adjusted, or time setting of the derailleurs can be adjusted, or the stiffness's of the suspensions can be adjusted. Once in the "Set Mode", the switches 16*a* to 16*c* and 18*a* to 18*c* function as a enter keys and/or navigation keys to change the settings stored in the memory of the cycle computer 14.

Figure 7:
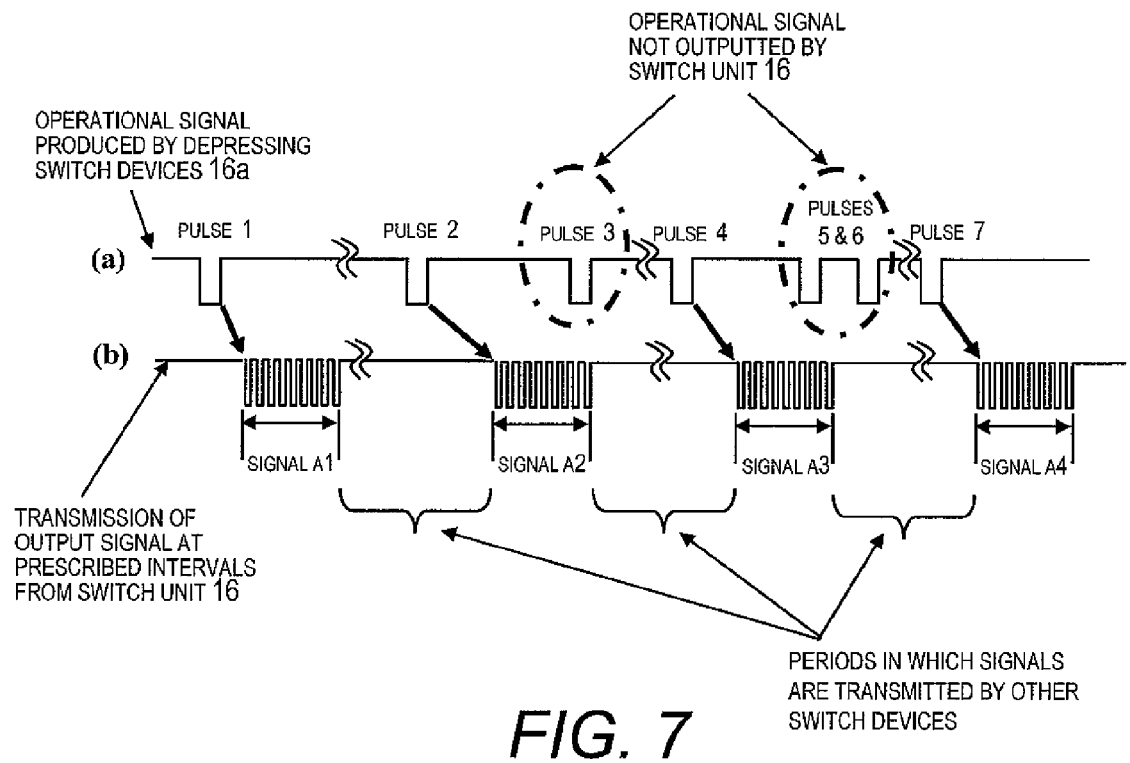
FIG. 7 is a timing chart indicating the correlation between an operation signal received by the microprocessor, and the reception of the output signal by the cycle computer in which only one of the switch units is being operated.

Referring now to FIG. 7, a timing chart is illustrated indicating the correlation between an operation signal received by the microprocessor 80, and the reception of the output signal by the cycle computer 14 in which only the switch unit 16 is being operated. As seen in FIG. 7, a transmission line (a) depicts operation of the switch 16*a* with a straight horizontal base line indicating that the switch 16*a* is not being operated and the downward fluctuations (pulses) indicating that the switch 16*a* has been operated. Thus, the fall of the downward fluctuations (pulses) indicates the starting of the pushing action by the rider, while the rise of the downward fluctuations (pulses) indicates a releasing action by the rider. A transmission line (b) in FIG. 7 depicts by the periodic transmissions of the status information data that includes the switch identification code and the switch operation code by the transmitter/receiver 82 of the switch unit 16 to the cycle computer 14. Since the transmitter/receiver 82 of the switch unit 16 transmits its output signals at regular intervals, the transmitter/receiver 92 of the switch unit 18 can transmit its output signals at regular intervals that do not interfere with the output signals of the switch unit 16. The other switches of the switch units 16 and 18 operate in the same manner as seen in FIG. 7, but with different transmission timings.

In the example shown in FIG. 7, the microprocessor 80 of the switch unit 16 will detect switch operations of the switch 16*a* (e.g., a switch sensor) when the switch 16*a* (e.g., switch sensor) are operated prior to the regularly scheduled transmission period of the microprocessor 80 of the switch unit 16, but after the immediately preceding regularly scheduled transmission period of the microprocessor 80 of the switch unit 16. Thus, in the example shown in FIG. 7, during a first regularly scheduled transmission period (output signal A1), the microprocessor 80 of the switch unit 16 transmits data relating to a first short push of a first operation signal (pulse 1) to the microprocessor 64 of the cycle computer 14.

During a second regularly scheduled transmission period (output signal A2), the microprocessor 80 of the switch unit 16 transmits data relating to a second short push of a second operation signal (pulse 2) to the microprocessor 64 of the cycle computer 14.

During a third regularly scheduled transmission period (output signal A3), the microprocessor 80 of the switch unit 16 transmits data relating to a fourth short push of a fourth operation signal (pulse 4) and to the microprocessor 64 of the cycle computer 14. In this third regularly scheduled transmission period (output signal A3), the microprocessor 80 of the switch unit 16 does not transmits the data relating to the third operation signal (pulse 3). Rather, the data (the switch operation code) for the fourth short push will indicate that two short pushes occurred between the start of the second regularly scheduled transmission period (output signal A2) and the start of the third regularly scheduled transmission period (output signal A3). For example, if the value of the code for the fourth short push is bigger than the previous value by 2, it is recognized that one operation signal has been skipped. Then, the system is controlled in the same manner as when the system receives the data twice. In this way, the microprocessor 80 of the switch unit 16 can distinguish between a single short push signal and multiple short push signals.

During a fourth regularly scheduled transmission period (output signal A4), the microprocessor 80 of the switch unit 16 transmits data relating to a seventh short push of a seventh operation signal (pulse 7) to the microprocessor 64 of the cycle computer 14. This time, the data (the switch operation code) for the seventh short push will indicate that three short pushes occurred between the start of the third regularly scheduled transmission period (output signal A3) and the start of the fourth regularly scheduled transmission period (output signal A4). For example, if the value of the code for the seventh short push is bigger than the previous value by 3, it is recognized that two operation signals has been skipped. Then, the system is controlled in the same manner as when the system receives the data three times. Again, in this way, the microprocessor 80 of the switch unit 16 can distinguish between a single short push signal and multiple short push signals.

This same process is used by the microprocessor 90 of the switch unit 18 for distinguish between a single short push signal and multiple short push signals. In other words, the microprocessor 90 of the switch unit 18 has regularly scheduled transmission periods that do not overlap with the regularly scheduled transmission period of the microprocessor 80 of the switch unit 16. Also the microprocessor 90 of the switch unit 18 will only send a signal to the microprocessor 64 of the cycle computer 14 for switch operations detected during from the start of the immediately preceding regularly scheduled transmission period to the start of the current regularly scheduled transmission period of the microprocessor 90 of the switch unit 18.

Figure 8:
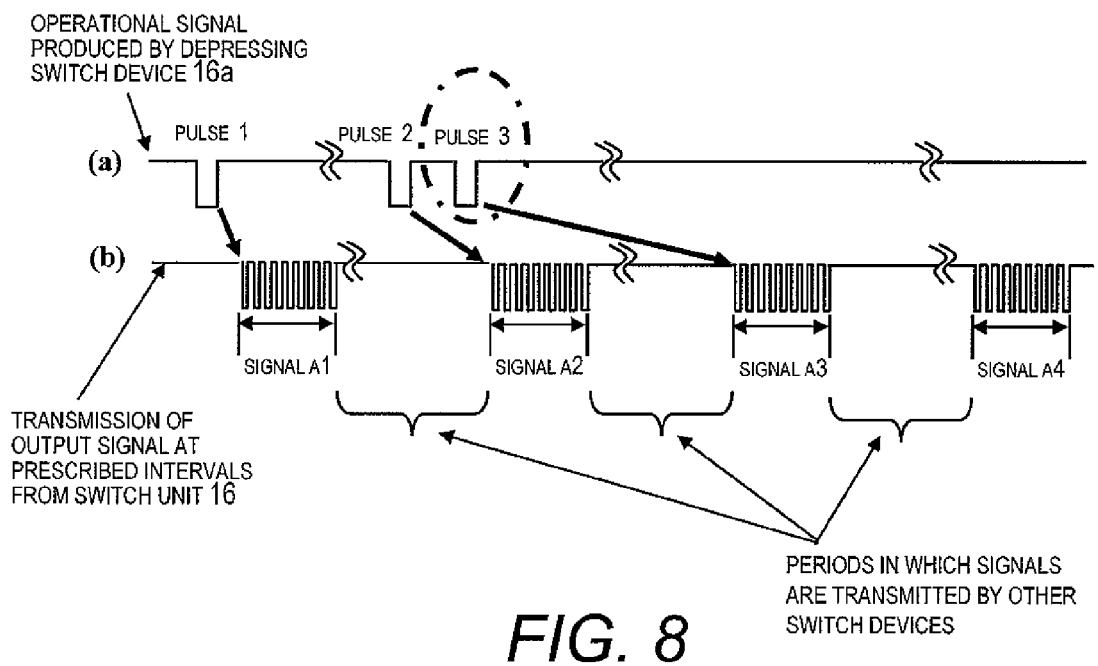
FIG. 8 is another timing chart, similar to FIG. 7, indicating the correlation between an operation signal received by the microprocessor, and the reception of the output signal by the cycle computer in which only one of the switch units is being operated.

Referring now to FIG. 8, the time lag correction data will now be discussed. As mentioned above, the time lag correction data is generated by the microprocessors 80 and 90 of the switch units 16 and 18 for each of the operation signals that it receives. The time lag correction data can be used by the microprocessor 64 of the cycle computer 14 in order to avoid miss distinguishing the output signals from the microprocessors 80 and 90 of the switch units 16 and 18. In the example shown in FIG. 8, between the first and second regularly scheduled transmission periods (output signals A1 and A2), the microprocessor 80 of the switch unit 16 detects both the second and third operation signals (pulses 2 and 3), but only transmits the second operation signal (pulse 2) since the third operation signal (pulse 3) was not processed in time before the start of the third regularly scheduled transmission period (signal 3). In this case, the microprocessor 80 of the switch unit 16 will transmit the third operation signal (pulse 3) during a third regularly scheduled transmission period (signal 3). Since time lag correction data is included in the status information data of the third operation signal (pulse 3), the microprocessor 64 of the cycle computer 14 will determine that the third operation signal (pulse 3) occurred during the time period between the first and second regularly scheduled transmission periods (output signals A1 and A2). Thus, using the time lag correction data of the second and third operation signals (pulses 2 and 3), the microprocessor 64 of the cycle computer 14 can accurately determine that the second and third operation signals (pulses 2 and 3) are two short pushes that occurred with in a prescribed time threshold so as to be interpreted as two multiple short pushes instead of two separate short pushes.

Figure 9:
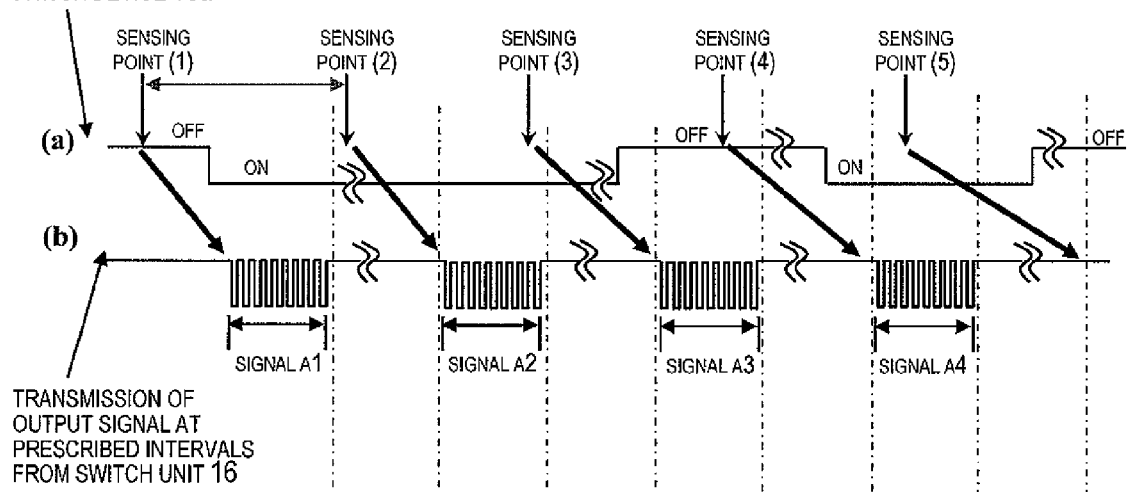
FIG. 9 is a timing chart indicating the correlation between a pair of operation signals received by the microprocessor, and the reception of the output signal by the cycle computer in which both of the switch units are being operated.
Figure 9:
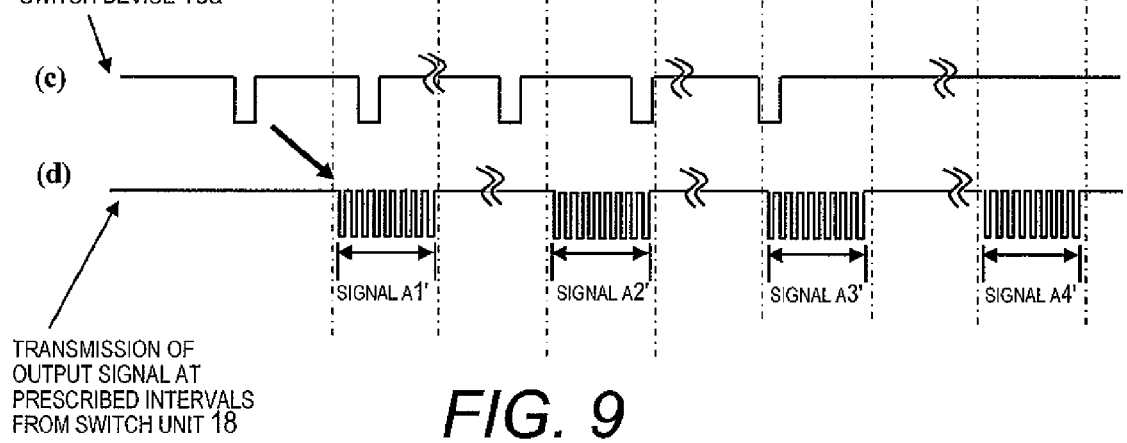

Referring now to FIG. 9, a timing chart is illustrated indicating the correlation between a pair of operation signals received by the microprocessors 80 and 90, and the reception of the output signals by the cycle computer 14 in which both of the switch units 16 and 18 are being operated. As seen in FIG. 9, a transmission line (a) depicts operation of the switch 16a, while transmission line (b) in FIG. 9 depicts by the periodic transmissions of the status information data (e.g., the switch identification code and the switch operation code) by the transmitter/receiver 82 of the switch unit 16 to the cycle computer 14. Also as seen in FIG. 9, a transmission line (c) depicts operation of the switch 18a, while transmission line (d) in FIG. 9 depicts by the periodic transmissions of the status information data (e.g., the switch identification code and the switch operation code) by the transmitter/receiver 92 of the switch unit 18 to the cycle computer 14. Similar to the other timing charts, in FIG. 9, a straight horizontal base line indicates that the switch 16a or 18a is not being operated and the downward fluctuations (pulses) indicate that the switch 16a or 18a has been operated. Thus, the fall of the downward fluctuations (pulses) indicates the starting of the pushing action by the rider, while the rise of the downward fluctuations (pulses) indicates a releasing action by the rider. Since the transmitter/receiver 82 of the switch unit 16 transmits its output signals A1, A2, A3, A4, etc. at regular intervals, the transmitter/receiver 92 of the switch unit 18 can transmit its output signals A1', A2', A3', A4', etc. at regular intervals that do not interfere with the output signals A1, A2, A3, A4, etc of the switch unit 16.

In the case of the illustrated embodiment, when a long push is performed as seen in the transmission line (a) of FIG. 9, the microprocessor 80 of the switch unit 16 distinguishes between a long push and a short push based the length of the push exceeding a prescribed time threshold. First, in order to distinguish between a long push that is operated from an OFF state and a long push that has been operated continuously, the initial value of the code for the long push that is operated from the OFF state is set to "0". Thus, in FIG. 9, at a first sensing point (1) of switch sensor, the switch sensor (electrical circuit on the printed circuit board 76) senses the switch 16a is OFF, which means the switch 16a is not pushed (turned-off). When the switch 16a is pushed (turned-on), the switch sensor outputs an ON signal (pulse) to the microprocessor 80, and starts a time count of a counter for sensing a long push. If the ON signal (pulse) continues until a second sensing point (2) for a long push, then the switch sensor distinguishes it is a long push and the microprocessor 80 transmits the output signal A2 accordingly. In other words, when an up-edge of the ON signal (pulse) is NOT sensed until after the second sensing point for long push, the switch sensor distinguishes it is a multiple long push because the prescribed time threshold has been exceeded. If the ON signal pulse) continues until a third sensing point (3) for long, then the switch sensor continues to distinguish it is a multiple long push and the microprocessor 80 transmits the output signal A3 accordingly. In other words, an up-edge of the ON signal (pulse) is not sensed until after the third sensing point (3) for long push, then the switch sensor also distinguishes it is a long push because a second prescribed long push threshold has been exceeded. When the switch 16*a* is released (turn off), an up-edge of the ON signal (pulse) occurs. In this case illustrated in FIG. 9, the up-edge of the ON signal (pulse) rises before a next sensing point (4) for the long push. Thus, the next sensing point (4) of the switch sensor senses the switch 16*a* is OFF, which means the switch 16*a* is NOT pushed. So, at the fourth transmission period in FIG. 9, the microcomputer 80 sends the output signal that means the switch 16*a* is NOT pushed.

After then, the switch 16*a* is pushed (turned-on) again, the switch sensor outputs the ON signal (pulse), and starts a time count for sensing the long push again. The ON signal (pulse) continues over the next sensing point (5) for a long push. In other words, an up-edge of the ON signal (pulse) is not sensed until the sensing point for a long push point has been exceeded. Thus, the switch sensor distinguishes it is a long push. At the fifth transmission period (not shown), the microcomputer 80 sends a signal that means the long push has occurred. Since the up-edge of the ON signal (pulse) rises again before the next sensing point for long push, at the sixth transmission period (not shown), the microcomputer 80 sends a signal that means the long push has occurred.

Accordingly, if a down-edge and an up-edge of the ON signal (pulse) is sensed within a predetermined time, then the switch sensor distinguishes it is a short push. On the other hands, the down-edge and the up-edge of the ON signal (pulse) is not sensed before count-up a predetermined time, the switch sensor distinguishes it is a long push. Thus, a counter or timer is used that starts at the time of depression of the switch and stops at the time of release of the switch.

As mentioned above, the microprocessor 64 of the cycle computer 14 optionally sends a confirmation signal indicating a receipt of the out put signal. If the microprocessor 80 or 90 does not receive such a confirmation signal, then at the next regularly scheduled transmission period, the microprocessor 80 or 90 can retransmit the previous status information data to the cycle computer 14. In this case, the output signal should include a code for identifying a number of retransmission of data having the same status information. With this method, if the status information data is updated before the completion of the communication (that is determined with the confirmation signal from the cycle computer), updated status information data is transmitted. Therefore, the cycle computer can receive the updated status information without a delay.

Also as mentioned above, optionally, time lag correction data for data that requires a high accuracy about switch operation timing can be sent with each operation of a switch device. The value of the code corresponds to a time lag between switch operation timing and a transmission timing of the status information. The code may include a corresponding value of the timing that satisfies the desired accuracy. The value of the code can be a direct correction value (presumably, correction timing itself). However, if the value is the direct correction value, then the value increases every time the status information is retransmitted, which results in that a data size of the code for correction data increases. Thus, it is preferable that the value of the code is always set to a value between the switch operation timing and a first transmission timing, and a correction is performed by calculating the correction value based on the value of the code, a transmission cycle and the code for the number of the retransmission.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control system comprising:
   a first switch device including a first switch operation member, a first sensor arranged relative to the first switch operation member to detect operation of the first switch operation member, a first processing unit operatively coupled to the first sensor and a first transmitter arranged to periodically transmit first output signals at first prescribed transmission timings;
   a second switch device including a second switch operation member, a second sensor arranged relative to the second switch operation member to detect operation of the second switch operation member, a second processing unit operatively coupled to the second sensor and a second transmitter arranged to periodically transmit second output signals at second prescribed transmission timings; and
   a cycle computer including a receiver arranged to receive the output signals from the transmitters of the first and second switch devices,
   the first processing unit of the first switch device including
      a first identification code generating member that generates first identification codes related to identification of the first switch device,
      a first operating signal generating member that generates first operation codes indicative of operation of the first switch operation member, with only one of the first operation codes being generated between starting points of the first prescribed transmission timings, the first operation codes containing data indicative of a number of operations of the first switch operation member occurring since a starting point of an immediately preceding one of the first prescribed transmission timings, and a first output member that combines the first identification codes and corresponding ones of the first operation codes as the first output signals to be transmitted by the first transmitter of the first switch device, the second processing unit of the second switch device including a second identification code generating member that generates second identification codes related to identification of the second switch device, a second operating signal generating member that generates second operation codes indicative of operation of the second switch operation member, and a second output member that combines the second identification codes and corresponding ones of the second operation codes as the second output signals to be transmitted by the second transmitter of the second switch device, with the first and second prescribed transmission timings being such that the first and second output signals are sent to the cycle computer at recurring prescribed intervals in a non-overlapping manner, the first operating signal generating member generating time lag data as part of the first operation codes in response to an operation of the first switch operating member which occurs prior to a subsequent one of the starting points of the first prescribed transmission timings and which is not transmitted with the only one of the first operation codes transmitted after a starting point immediately preceding the subsequent one of the starting points of the first prescribed transmission timings.

2. The bicycle control system according to claim 1, wherein
the first transmitter of the first switch device is configured to transmit the first output signals wirelessly,
the second transmitter of the second switch device is configured to transmit the second output signals wirelessly, and
the cycle computer is configured to receive the first output signals from the first transmitter of the first switch device and the second output signals from the second transmitter of the second switch device wirelessly.

3. The bicycle control system according to claim 1, wherein
the first switch device further includes a first receiver,
the second switch device further includes a second receiver, and
the cycle computer further includes a transmitter that is configured to transmit confirmation signals to the receivers of the first and second switch devices.

4. The bicycle control system according to claim 3 wherein the transmitters and receivers of the first and second switch devices and the cycle computer are two way wireless communication devices.

5. The bicycle control system according to claim 1, wherein
the first operating signal generating member of the first processing unit of the first switch device generates a first operation signal for each of the first operation codes in which operation of the first switch operation member is for a short period of time below a first prescribed time threshold and a second operation signal for each of the first operation codes in which operation of the first switch operation member is for a long period of time above a second prescribed time threshold that is equal to or greater than the first prescribed time threshold, and
the second operating signal generating member of the second processing unit of the second switch device generates a third operation signal for each of the second operation codes in which operation of the second switch operation member is for the short period of time below a third prescribed time threshold and a fourth operation signal for each of the second operation codes in which operation of the second switch operation member is for the long period of time above a fourth prescribed time threshold that is equal to or greater than the third prescribed time threshold.

6. The bicycle control system according to claim 1, wherein
the operating signal generating members of the processing units of the first and second switch devices generate numerical data as part of the operation codes upon each time the switch operation members are operated, respectively.

7. A bicycle control system comprising:
a first switch device including a first switch operation member, a first sensor arranged relative to the first switch operation member to detect operation of the first switch operation member, a first processing unit operatively coupled to the first sensor and a first transmitter arranged to periodically transmit first output signals at first prescribed transmission timings,
the first processing unit of the first switch device including
a first identification code generating member that generates first identification codes related to identification of the first switch device,
a first operating signal generating member that generates first operation codes indicative of operation of the first switch operation member, with only one of the first operation codes being generated between starting points of the first prescribed transmission timings, the first operation codes containing data indicative of a number of operations of the first switch operation member occurring since a starting point of an immediately preceding one of the first prescribed transmission timings, and
a first output member that combines the first identification codes and corresponding ones of the first operation codes as the first output signals to be transmitted by the first transmitter of the first switch device; and
a cycle computer including a receiver arranged to receive the first output signals from the first transmitter.

8. The bicycle control system according to claim 7, wherein
the first transmitter of the first switch device is configured to transmit the first output signals wirelessly, and
the cycle computer is configured to receive the first output signals from the first transmitter of the first switch device wirelessly.

9. The bicycle control system according to claim 7, wherein
the first switch device further includes a first receiver, and
the cycle computer further includes a transmitter that is configured to transmit confirmation signals to the first receiver.

10. The bicycle control system according to claim 9, wherein the first transmitter and the first receiver and the cycle computer are two way wireless communication devices.

11. The bicycle control system according to claim 7, wherein the first operating signal generating member of the first processing unit of the first switch device generates a first operation signal for each of the first operation codes in which operation of the first switch operation member is for a short period of time below a first prescribed time threshold and a second operation signal for each of the first operation codes in which operation of the first switch operation member is for a long period of time above a second prescribed time threshold that is equal to or greater than the first prescribed time threshold.

12. The bicycle control system according to claim 7, wherein the first operating signal generating member generates numerical data as part of the first operation codes upon each time the first switch operation member is operated.

13. The bicycle control system according to claim 7, wherein the first operating signal generating member generates time lag data as part of the first operation codes in response to an operation of the first switch operating member which occurs prior to a subsequent one of the starting points of the first prescribed transmission timings and which is not transmitted with the only one of the first operation codes transmitted after a starting point immediately preceding the subsequent one of the starting points of the first prescribed transmission timings.

14. The bicycle control system according to claim 7, further comprising a second switch device including a second switch operation member, a second sensor arranged relative to the second switch operation member to detect operation of the second switch operation member, a second processing unit operatively coupled to the second sensor and a second transmitter arranged to periodically transmit second output signals at second prescribed transmission timings, the second processing unit of the second switch device including a second identification code generating member that generates second identification codes related to identification of the second switch device, a second operating signal generating member that generates second operation codes indicative of operation of the second switch operation member, with only one of the second operation codes being generated between starting points of the second prescribed transmission timings, the second operation codes containing data indicative of a number of operations of the second switch operation member occurring since a starting point of an immediately preceding one of the second prescribed transmission timings, and a second output member that combines the second identification codes and corresponding ones of the second operation codes as the second output signals to be transmitted by the second transmitter of the second switch device, the receiver of the cycle computer being arranged to receive the second output signals from the second transmitter.

15. The bicycle control system according to claim 13, wherein the second transmitter of the second switch device is configured to transmit the second output signals wirelessly, and the cycle computer is configured to receive the second output signals from the second transmitter of the second switch device wirelessly.

16. The bicycle control system according to claim 13, wherein the second switch device further includes a second receiver, and the transmitter of the cycle computer is further configured to transmit confirmation signals to the second receiver.

17. The bicycle control system according to claim 15, wherein the second transmitter and the second receiver and the cycle computer are two way wireless communication devices.

18. The bicycle control system according to claim 13, wherein the second operating signal generating member of the second processing unit of the second switch device generates a first operation signal for each of the second operation codes in which operation of the second switch operation member is for a short period of time below a first prescribed time threshold and a second operation signal for each of the second operation codes in which operation of the second switch operation member is for a long period of time above a second prescribed time threshold that is equal to or greater than the first prescribed time threshold.

19. The bicycle control system according to claim 13, wherein the second operating signal generating member generates numerical data as part of the second operation codes upon each time the second switch operation member is operated.

20. The bicycle control system according to claim 13, wherein the second operating signal generating member generates time lag data as part of the second operation codes in response to an operation of the second switch operating member which occurs prior to a subsequent one of the starting points of the second prescribed transmission timings and which is not transmitted with the only one of the second operation codes transmitted after a starting point immediately preceding the subsequent one of the starting points of the second prescribed transmission timings.

* * * * *